Figure 1:
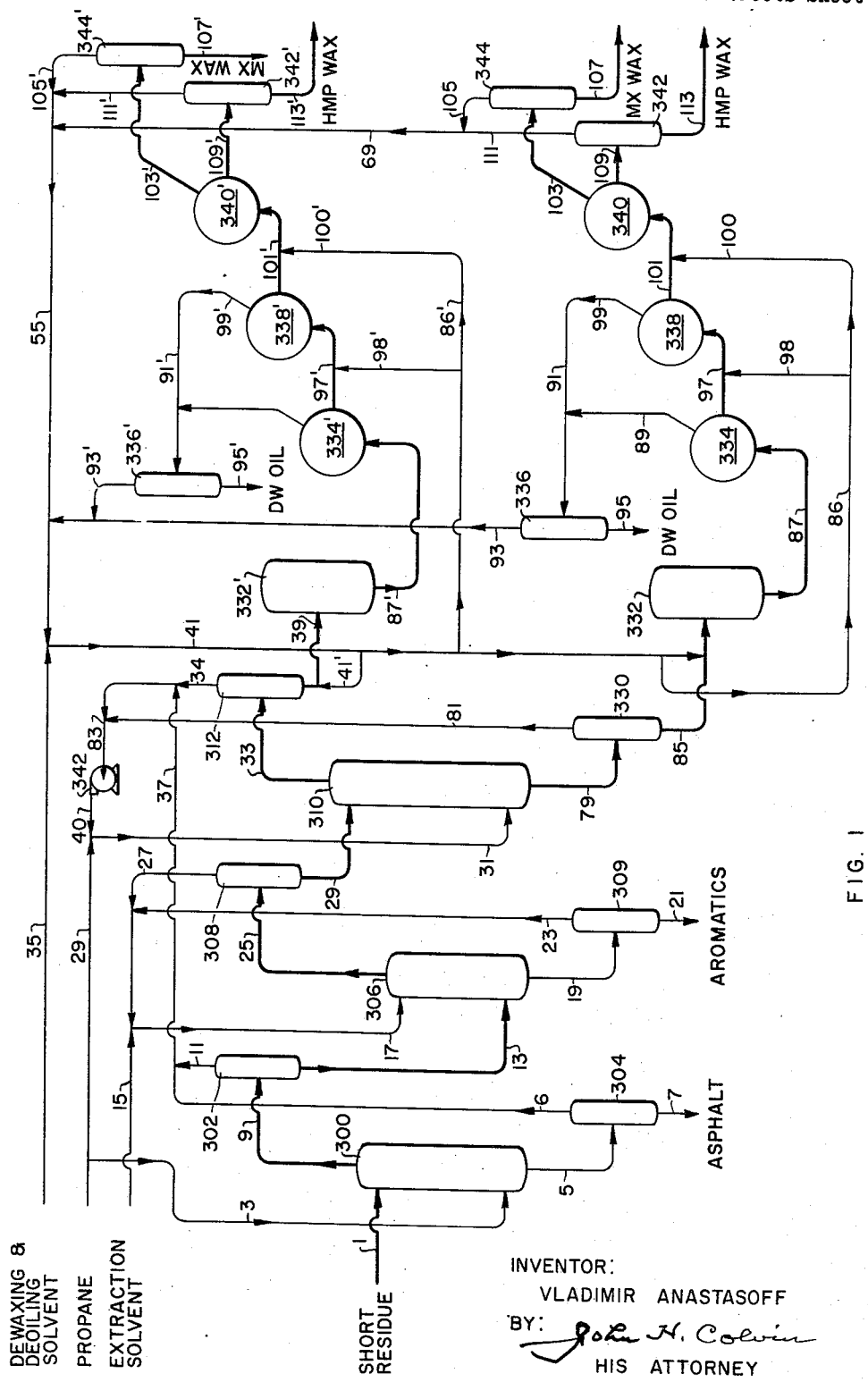
Figure 2:
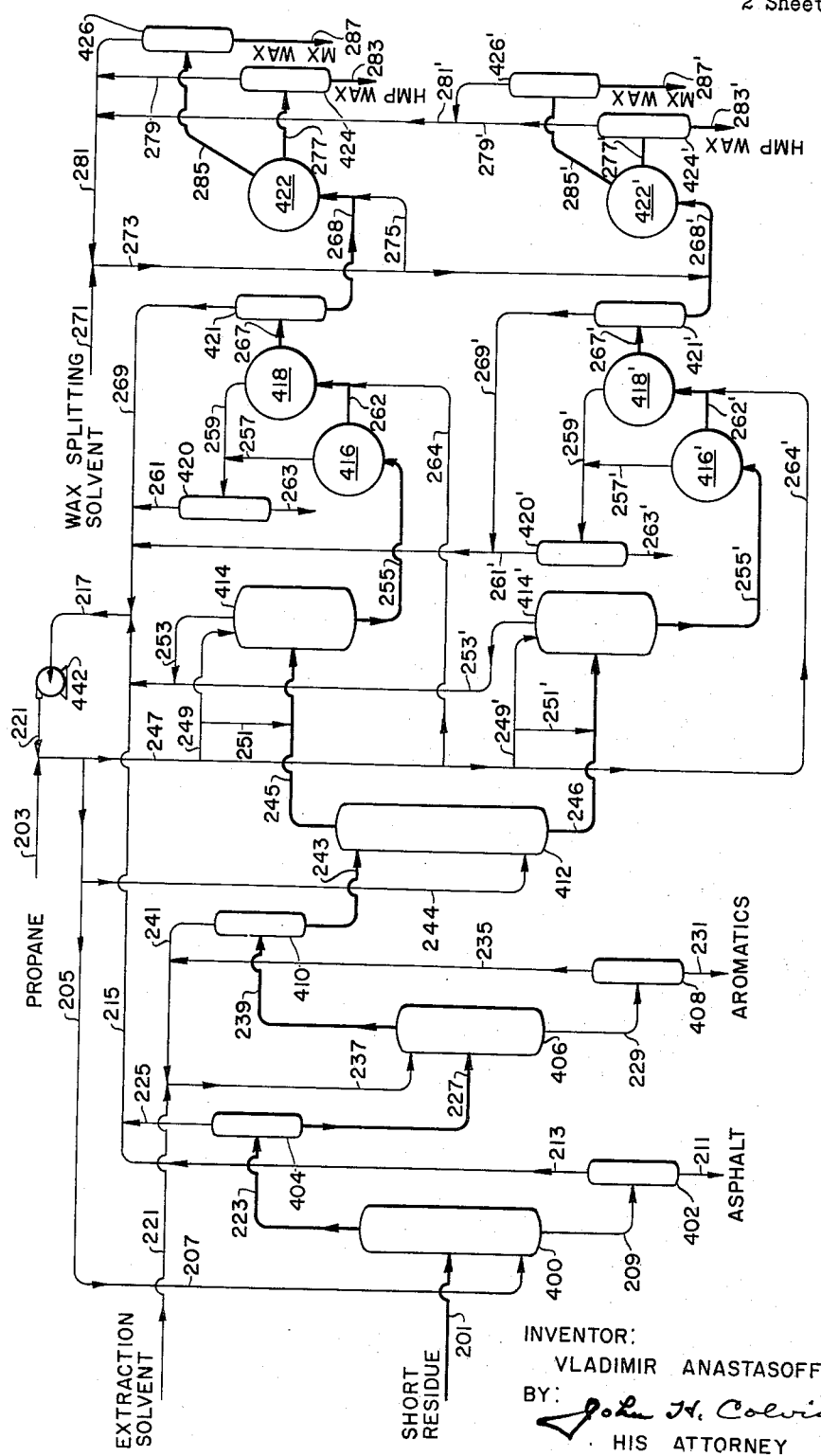

Dec. 12, 1961 V. ANASTASOFF 3,012,960
MANUFACTURE OF LUBRICATING OILS AND WAXES
Filed July 28, 1959 2 Sheets-Sheet 1

INVENTOR:
VLADIMIR ANASTASOFF
BY: John N. Colvin
HIS ATTORNEY

United States Patent Office 3,012,960
Patented Dec. 12, 1961

3,012,960
MANUFACTURE OF LUBRICATING
OILS AND WAXES
Vladimir Anastasoff, Houston, Tex., assignor to Shell Oil
Company, a corporation of Delaware
Filed July 28, 1959, Ser. No. 830,128
7 Claims. (Cl. 208—31)

This invention relates to hydrocarbon waxes and to their preparation. More particularly, it relates to the preparation of high melting waxes from petroleum distillation residues, especially such distillation residues having a mixed base character.

Generally, hydrocarbon waxes are produced (separated) from oily wax masses recovered from petroleum lubricating oil base stocks during the treatment of such lubricating oil stocks to remove therefrom materials which markedly reduce the fluidity of the oil when it is cooled to low temperatures, such as 0° C. and the like. In order to produce lubricating oils with given viscosity characteristics, the base stock is generally first separated into different fractions by distillation, under reduced pressure, and the distillate fractions, as well as the residual fraction, are subsequently "dewaxed" to remove the higher melting hydrocarbons present and to produce an oil with a suitable pour point. In the case of stocks which contain aromatic and resinous materials, these are usually removed by deasphalting with a low-boiling hydrocarbon and extracting with a selective solvent, such as furfural, phenol, and the like, such treatment being generally carried out before the dewaxing. The dewaxing may be effected simply by chilling the waxy oil fraction to crystallize the higher melting hydrocarbons present therein, and pressing, filtering or centrifuging to separate the oil from the wax, which is called "slack" wax or crude wax and which is an oily wax mass of solidified hydrocarbons and liquid hydrocarbons entrained therewith. By the well-known "sweating" operation, the oils (liquid hydrocarbons) may be at least partially removed from the slack or crude wax, thereby yielding a harder wax product, the so-called "scale" wax, and a still more oily wax product, termed "slop" wax, which is a soft wax. Essentially the same separations may be effected in the presence of an inert diluent, such as a light hydrocarbon-propane, butane, and the like—or in the presence of various organic solvents which may exert preferential solvent action for one type of hydrocarbons present over another type present, such as methyl ethyl ketone, acetone, benzene, toluene, and the like, and mixtures thereof, as is well known and practiced in the art, with appropriate selection of dewaxing temperatures for the waxy oil and of deoiling temperatures for deoiling the oily wax.

The lower melting paraffin waxes are obtained from the lower boiling distillate fractions, while the higher melting paraffin waxes are derived from the higher boiling distillate fractions. However, the hardness of the deoiled distillate wax at room temperature remains relatively constant as the heavier, i.e., higher boiling and higher molecular weight distillate fractions are utilized as a source of the wax. In the case of the residual material from the vacuum distillation, the waxes obtained therefrom are of still higher molecular weight, but appear to be of an entirely different character, their nature being such that a mass thereof is obtained which to the unaided eye appears to have no crystalline character and to be amorphous, having somewhat plastic characteristics and having refractive indices indicating the principal components to be non-straight chain hydrocarbons and to be a mixture of isoparaffinic, naphthenic and aromatic hydrocarbons. Magnification reveals a microcrystalline structure, hence the name "microcrystalline" (MX) wax.

There are applications for hydrocarbon waxes where it is desirable that the wax have a higher melting point than that of the crystalline paraffin waxes obtainable from distillate fractions and yet have hardness and other physical characteristics corresponding to those of the crystalline paraffin waxes and not of the microcrystalline waxes. Consequently, much effort has been expended in the search for ways in which to separate the crystalline and microcrystalline waxes which are present in petroleum distillation residues. A particularly effective method for accomplishing this is described in Arabian, U.S. Patent 2,668,140, issued February 2, 1954. According to the Arabian process the separation of the high melting, hard crystalline waxes is effected by dissolving the residual waxy mixture (preferably after separation of the waxes present from the major proportion of the oil components of the waxy residue, as by the usual dewaxing and deoiling operations, which dewaxing and deoiling are effected subsequent to application of well known deasphaltizing operations if desired, as in the case of distillation residues which contain appreciable proportions of asphaltic bodies) in a suitable diluent, such as a light liquid hydrocarbon, but preferably in an organic solvent, such as methyl ethyl ketone in admixture with benzene, which mixture has some preferential solvent powers for non-straight chain paraffin hydrocarbons as compared with the solvent power for straight chain paraffin hydrocarbons, adjusting the temperature of the solution to a suitable temperature, which temperature is usually about 100° F. or higher, and is selected to precipitate from the solution the high melting point, hard, crystalline paraffin wax consisting for the most part only of straight-chain paraffin waxes. After separation of the precipitated crystalline wax from the solution, as by filtration or centrifugation, the remainder of the wax is obtained from the separated solution either by distillation to remove the solvent or by cooling the solution to a suitable lower temperature, such as the temperature at which the residual wax mixture had been previously deoiled, such as about 40°–60° F., followed by separation of the precipitated wax product from the solvent, thereby yielding a high melting, plastic-like, highly ductile wax product of a microcrystalline character and composed, for the most part, of iso- or branched-chain paraffinic hydrocarbons, and naphthenic hydrocarbons with a minimum of straight-chain paraffin hydrocarbons present.

For some applications, such as some wax-treated papers and packaging material, even higher melting and thus harder crystalline waxes are desired. Likewise, purer and more highly branched microcrystalline waxes are needed which will be more effective blending materials for purposes of imparting plasticity to higher melting waxes without concomitantly increasing the tackines sof the wax blend.

It is therefore a principal object of the present invention to produce high melting point crystalline waxes from petroleum stocks. It is also an object of the invention to produce such waxes having higher melting points, in relation to their average molecular weight, than were heretofore possible. A still further object is to produce extensively branched microcrystalline waxes having low molecular weights. Yet another object of this invention is to produce a dewaxed oil of high molecular weight and viscosity. The attainment of these objects, as well as others which will be apparent to those skilled in the art, will be better understood from the description of the invention, made with reference to the accompanying drawing, wherein:

FIGURES I and II are detailed schematic flow diagrams illustrating two preferred process schemes in which the invention may be applied to the commercial scale recovery and refining of waxes from residual lubricating oils. It will be noted in the drawings that where two materials are shown to be processed separately in essentially parallel lines and equipment, the corresponding parallel facilities are designated by the same numbers, followed by a prime mark.

It has now been found that the foregoing objects are achieved by treating wax-containing petroleum residues, from which the asphalt, resins, and aromatics have been largely removed, with a light hydrocarbon solvent at near conventional deasphalting conditions to form solvent-soluble and solvent-insoluble phases, followed by separation of the phases and removal of solvent therefrom, dewaxing separately both separated phases, and then dividing, and splitting the two wax fractions produced thereby.

Light hydrocarbons, particularly propane, have long been used as selective solvents in the deasphalting of residual stocks for lubricating oil production, and more recently for decarbonizing of catalytic cracking feed stocks. Both of these processes make use of the unique properties of propane at or near its critical conditions (206° F., 617 p.s.i.a.). As the temperature and pressure approach the critical conditions, propane tends to reject or precipitate from solution those materials which are specifically most unlike itself. The precise structure of the materials thus precipitated, and the type or extent of the structural dissimilarity are not known or predictable with any degree of exactitude because of the difficulties of defining the configuration of the complex high molecular weight materials which are precipitated from the solution with propane.

Propane under these conditions exhibits both a molecular type and a molecular weight selectivity. Furthermore, when a lubricating oil residue which has been deasphalted and extracted with an aromatics-selective solvent, i.e., a bright stock raffinate, is treated with propane, at near critical conditions with respect to the propane, two phases are formed, the waxes from which are different not only in molecular weight but also with regard to certain rheological properties.

The invention will be better understood from a more detailed description as applied to a particular material, such as the distillation residues from an East Texas crude stock.

A bright stock raffinate, which had been prepared by deasphalting and extracting a petroleum vacuum distillation residue (short residue) from an East Texas crude stock, was introduced continuously at an intermediate point into a 22-foot high treating tower. About 11 volumes of liquid propane, per volume of raffinate, were introduced near the bottom of the tower. The temperature in the bottom of the tower was 180° F. and the temperature in the top of the tower was 205° F. A pressure of 700 p.s.i.g. was maintained in the system. Approximately 78% of the raffinate was dissolved in the propane. The propane-soluble phase was removed from the top of the column and the propane removed therefrom. About 22% of the feed was rejected by the propane and passed to the bottom of the column from which it was removed and freed of entrained propane solvent. The properties of the bright stock raffinate charge stock and the resulting products were as given in Table I.

Table I

| Fraction | Gravity | Molecular Wt. | Refractive Index | Sulfur, percent wt. |
|---|---|---|---|---|
| Charge | 27.6 | 718 | 1.4710 | 0.22 |
| Propane-Soluble | 28.3 | 694 | 1.4681 | 0.18 |
| Propane-Insoluble | 24.7 | 876 | 1.4813 | 0.32 |

The foregoing propane-separated fractions, and, for comparison, a portion of the same raffinate which had not been propane-fractionated, were then dewaxed by dissolving each fraction in methyl ethyl ketone followed by chilling to precipitate the wax, and separation of the wax by filtration. The separated crude waxes from each fraction were deoiled with methyl ethyl ketone and then recrystallized into a high-melting paraffin (HMP) wax and a low melting microcrystalline (MX) wax. The properties of the resultant oil and wax products are compared in Table II.

Table II

| Product | Molecular Weight | Viscosity SSU at 100° F. | Congealing Point, °F. | Penetration 77° F. | Penetration 110° F. |
|---|---|---|---|---|---|
| Dewaxed oil from untreated raffinate (+20° F. P. Pt.) | 687 | 3,184 | | | |
| HMP wax from untreated raffinate | | | 184 | 4 | 14 |
| MX wax from untreated raffinate | | | 136 | 22 | 125-165 |
| Dewaxed oil from propane-soluble fraction | 661 | 2,247 | | | |
| HMP wax from propane-soluble fraction | | | 179 | 9 | 28 |
| MX wax from propane-soluble fraction | 630 | | 132 | 30 | >256 |
| Dewaxed oil from propane-insoluble fraction | 821 | 13,025 | | | |
| HMP wax from propane-insoluble fraction | | | 188 | 5 | 16 |
| MX wax from propane-insoluble fraction | 880 | | 132 | 19 | 52 |

From a comparison of the molecular weights of both the waxy fractions obtained by the fractionation with propane (Table I), and the products obtained therefrom (Table II), it is apparent that a molecular weight separation was brought about. However, the higher refractive index of the propane-insoluble material indicates also that the separation was of molecular types as well. The low congealing point of the MX wax obtained from the propane-insoluble fraction is indeed surprising in view of the higher molecular weight 880 versus 630). This indicates a high degree of branching in the wax and is, of course, further evidence of the subtle degree of molecular type separation attainable by the process of this invention which imparts unique properties to the products therefrom. The exceptionally high viscosity, highly branched dewaxed oil from the propane-insoluble fraction is a particularly desirable component for lubricants exposed to nuclear radiation.

The importance and relationship of the present invention to the commercial-scale production of lubricating oils and waxes will be even more apparent by reference to the drawing.

Referring now to FIGURE I of the drawing, a distillation residue (short residue) from the vacuum distillation of an East Texas crude stock and having a gravity of about 14.5° API and an initial boiling point of about 890° F. is passed via line 1 through various heat exchange-means (not shown) to a point near the top of deasphalting zone 300. Simultaneously 10 volumes of propane, per volume of short residue, are passed via line 3 to a point near the bottom of zone 300. Part of the oil is dissolved by upward flowing propane while the remainder is rejected by the propane and falls to the bottom of the zone. An interface between the soluble and insoluble phases is formed at an intermediate point in the zone. About 40% of the charge oil is rejected from the propane into the lower or propane-insoluble phase. This lower phase is removed via line 5 to desolventizing zone 304 wherein the entrained propane and other volatiles are flashed overhead and removed by means of line 6. The recovered solvent vapor is passed via lines 6, 37 and 83 to compressor 342; it is compressed and cooled (not shown) and reliquefied. Upon removal of water and heavier contaminants, the compressed liquid propane is passed back via line 40 into the propane supply system. Desolventized asphalt is transferred via line 7 to storage. The upper or propane-soluble portion of the feed, which is 60% of the total oil charge, is passed by line 9 to desolventizing zone 302 wherein the propane solvent is removed from the oil by flashing and passed to the aforementioned propane recovery system via lines 11 and 37. The solvent-free deasphalted oil is removed from the bottom of zone 302 and passed via line 13 to extraction zone 306 for removal of the aromatics present in the deasphalted short residue oil. An aromatics-selective solvent is passed via lines 15 and 17 to extraction zone 306 and enters in such a manner as to pass countercurrently to the flow of charge oil. Phenol is a preferred solvent for removing aromatics from lubricating oils but others, such as furfural, nitrobenzene, sulfur dioxide, cresylic acids, sulfolane, and β,β' dichloroethyl ether may also be used. About 2.25 volumes of phenol are employed per volume of deasphalted oil charge. The extraction process is preferably a continuous countercurrent operation, though batch or semi-continuous operations are, of course, operable. A particular advantageous extraction means is a centrifugal extractor such as represented by Podbielniak, U.S. 2,670,132, issued February 23, 1954. Various reflux, backwash, and counter-solvent operations may be used therewith, all of which are well known in the art of solvent extraction. The solvent-containing extract from zone 306 is passed via line 19 to desolventizing zone 309 wherein the solvent is removed by one or more distillation steps, one of which may be under vacuum. The desolventized aromatics are passed through line 21 to storage. The distilled solvent vapor is removed by line 23, condensed and cooled (by means not shown) and returned to the solvent supply system. The raffinate from extraction zone 306, which is considerably reduced in aromatics, contains a small amount of solvent and is passed through line 25 to desolventizing zone 308 wherein it is freed of solvent in a like manner to the extract. The solvent removed therefrom is passed to the solvent recovery system via line 27. The yield of raffinate is about 74% by volume.

By the foregoing processing steps, the wax-containing residual oil is essentially completely deasphaltized and largely dearomatized to a depth such that the subsequent propane fractionation is advantageously selective.

The raffinate from desolventizing zone 308, thus consists essentially of saturates, and is passed by means of line 29 to propane fractionation zone 310. This zone, as well as deasphalting zone 300, may be a vertical packed or baffled tower or other suitable means for effecting countercurrent contacting of the solvent with the oil. A particularly preferred device for carrying out the deasphalting and propane fractionation steps is a rotary disc contactor of the type referred to in Reman, U.S. 2,601,674, issued June 24, 1952.

Eleven volumes of propane per volume of raffinate are passed from the propane system via line 31 to a point near the bottom of zone 310. When the same operating conditions as already mentioned are used (180–205° F., 700 p.s.i.g.), from 18–22% of the raffinate is insoluble in the propane. Since it is heavier than the propane-oil solution, the propane-insoluble fraction passes to the bottom of zone 310 and is removed to desolventizing zone 330 by means of line 79. The entrained propane solvent vapors which are distilled off in zone 330 are removed overhead through lines 81 and 83 to the solvent propane recovery system. Likewise, the propane-soluble fraction, which contains the bulk of the propane, is removed via line 33 to desolventizing zone 312, wherein the propane solvent is flashed off and removed to the solvent recovery system via lines 34 and 83. The propane-separated fractions from the propane fractionation desolventizers are passed via lines 39 and 85, for the soluble and insoluble fractions respectively, to the dewaxing zones.

The processing of the two propane-fractionated waxy oil raffinates is parallel, i.e., the separations of the waxes therefrom are carried out in an essentially identical manner. Thus, they may be processed in the same equipment by using blocked-out operation, or, as shown in the drawing, they may be processed in parallel through essentially identical processing apparatus. For this reason, in order to avoid prolixity, only one of the two parallel operations need be discussed in detail, though both are shown in the drawing.

Processing of each of the propane-separated fractions consists essentially of three steps: (1) dewaxing and separation of the crude wax; (2) deoiling of the crude wax; and (3) splitting of the deoiled wax. Each of these processes may be performed as a single step or a plurality of steps as required by the particular stocks being processed. For example, in the deoiling step, which is shown in the drawing and detailed description thereof as a single repulping and wax separation step, a further redissolving, recrystallization, and wax separation sequence is frequently used to effect even better deoiling. Such variations in any of the three foregoing steps will be obvious to anyone skilled in the art of wax processing.

Referring once again to the drawing, and taking now the propane-insoluble oil fraction, upon desolventizing it is mixed with a solution of 60% methyl ethyl ketone (MEK) and 40% toluene from lines 35 and 41 in a ratio of about 3 volumes of solvent to one volume of oil (waxy raffinate). This solvent-oil mixture is heated to about 100° F. or higher by means not shown to dissolve all the oil and passed to chilling zone 332 wherein the wax-oil-solvent solution is chilled to about 20° F. to precipitate the wax. The wax-oil-solvent slurry thus formed is then passed by means of line 87 to separation zone 334 wherein the crude microcrystalline wax is separated from the solution of oil and solvent by filtration or other suitable means. Continuous rotary drum filters are particularly preferred for this purpose. The oil-solvent solution filtrate from which the wax has been removed, is transferred by line 89 to line 91 thence to solvent removal zone 336, wherein the solvent is removed from the dewaxed oil by distillation. The vaporized solvent from zone 336 is condensed (not shown) and passed by line 93, to the solvent system through line 55. The desolventized heavy dewaxed oil is passed to storage or further treatment, such as clay contacting, by means of line 95.

The crude microcrystalline wax recovered in zone 334 contains as much as 10–20% volume oil. Therefore, the oily or slack wax is passed through line 97 wherein it is mixed with additional solvent (MEK-toluene) furnished via lines 98, 86 and 41. About 11 volumes of solvent are used per volume of wax. The repulped slurry of oil, wax and solvent is filtered in filtration zone 338 wherein, the wax is separated from the oil-solvent solution. The thus deoiled primary microcrystalline wax contains on the order of 0.5% by volume oil at the completion of the deoiling step. The solvent-oil filtrate from the deoiling operations is passed via lines 99 and 91 to desolventizing zone 336 wherein it is included with the filtrate from the preceding dewaxing step.

The deoiled primary microcrystalline wax is passed through line 101 wherein it is mixed with an additional amount of dewaxing solvent from line 100 and heated to a temperature above the melting point of the HMP wax product. In the case of the instant East Texas material, it is heated to 195° F. The solvent-wax solution is cooled to a point about 65° F. below the melting point of the HMP wax, viz., here about 100–125° F., at which temperature the HMP wax is crystallized from solution. The slurry of crystallized HMP wax and wax-solvent solution is passed to filter 340 where the HMP wax is filtered out. The HMP wax is passed by means of line 109 to desolventizing zone 342 wherein the solvent contained in the wax is flashed off and removed via line 111. After condensation and cooling by means not shown, the solvent is returned via lines 69 and 55 to the dewaxing solvent system. The desolventized HMP wax is removed via line 113 to further processing or storage. The filtrate solution of MX wax and solvent is passed via line 103 to distillation zone 344 in which the solvent is removed from the MX wax by vaporization and returned to the solvent system via lines 105, 69, and 55. The thus separated MX wax is removed from zone 344, solidified by cooling and passed to further processing, such as clay treatment, or storage via line 107.

As mentioned hereinbefore, the processing of the propane-soluble fraction proceeds in the same manner as the propane-insoluble fraction. It will be obvious, however, that the temperature in the final wax-splitting operation should be adjusted to allow for the lower melting point of the waxes from the propane-soluble fraction. Thus, in the splitting operation, the deoiled wax from the propane-soluble fraction need be heated only to about 185° F. to dissolve all the wax in the solvent, and then may be cooled to 115° F. to crystallize the lower molecular weight HMP wax therefrom.

The waxes of the present invention may be obtained from petroleum oils derived from different formations or localities and having different specific characteristics, the only requirement being that the oil be of a paraffinic or paraffinic-naphthenic character, that is, that it contain paraffinic hydrocarbons of high molecular weight, including normal and iso-paraffinic hydrocarbons with or without naphthenic hydrocarbons. Generally the stock material is preferably a so-called mixed base oil, in that it is largely paraffinic and naphthenic in character, although containing appreciable amounts of asphaltic materials as well as non-asphaltic aromatic hydrocarbons. The invention is particularly applicable to waxy residues obtained from crudes of the character of East Texas crudes, which are valuable lubricating oil base stocks and yield substantial proportions of hydrocarbon waxes.

The propane-deasphalting and aromatics extraction steps described hereinbefore are, of course, well known and widely practiced in the art. The particular operating conditions therein vary widely with different lubricating oil stocks and are to a large extent chosen on the basis of the desired properties in the finished dewaxed oil. In any event, they are easily determined subjectively by anyone skilled in the art of lubricating oil treatment.

However, the operating conditions of the propane fractionation are critical to the process of the invention. Ordinary propane deasphalting conditions are normally carried out within the range of 125–170° F. and a pressure between 450 and 700 p.s.i.g. However, the propane fractionation step of the invention must be carried out nearer to critical conditions, that is to say, that higher temperatures must be used than were used in the preceding deasphalting step. The operating range of temperatures for the propane fractionation operation therefore falls between about 160° F. and 220° F. A particularly preferred range of operating temperature is from about 175° F. to 206° F. Though the process may be carried out at temperatures above the critical temperature (206 F.), no particular advantage is obtained thereby. The lower limit of temperature is established by relation to the temperature of the preceding deasphalting step and in all cases should be greater.

In deasphalting, 2.5–9.0 volumes of propane per volume of oil are used. However, greater selectivity is required for the propane fractionation step of this invention, and therefore higher propane to oil ratios are employed. Though the propane-to-oil ratio may extend from as low as 5 to as high as 30:1, it is preferred that the ratio be from about 10:1 to 20:1 in treating most short residue raffinate stocks.

Solvent dewaxing of lubricating oils is likewise a well known and widely used process. The operating conditions therein vary widely with the type of solvent employed and with the degree of wax removal desired for the "dewaxed" oil. Likewise, the deoiling conditions are dependent upon the type of solvent employed as well as other factors such as the character of the wax cake. It is preferred, however, that the oil content of the wax be reduced to 1% by volume or even less before the wax splitting operation.

In the foregoing example and in the drawing it is shown that the dewaxing-deoiling operation is carried out with a MEK-toluene solvent. A mixture of MEK, benzene, and toluene is also a preferred solvent. However, the operation may be carried out with other well-known dewaxing solvents such as propane, methyl isobutyl ketone, acetone, dichlorodiethyl ether, methyl isobutyl carbinol and the like, or mixtures thereof. If propane were employed, the solvent recovery steps between the propane fractionation and dewaxing-deoiling steps would be unnecessary.

This may be observed more clearly by reference to FIG. II, which is a schematic flow diagram illustrating the process of the invention in which propane is employed for dewaxing and deoiling as well as for the fractionation step. The processing of the short residue through the propane fractionation step is essentially identical to the process illustrated in FIG. I.

Referring now to FIG. II, a distillation residue (short residue) from the vacuum distillation of an East Texas crude stock and having a gravity of about 14.5° API and an initial boiling point of about 890° F. is passed via line 201 through various heat exchange means not shown to a point near the top of deasphalting zone 400. Simultaneously about 10 volumes of propane are passed via line 207 to a point near the bottom of zone 400. Part of the oil is dissolved by upward flowing propane while the remainder is rejected by the propane and falls to the bottom of the zone. About 40% of the charge oil is rejected from the propane into the lower or propane-insoluble phase. This lower phase is removed from the deasphalting zone via line 209 to desolventizing zone 402 wherein the entrained propane and other volatiles are flashed overhead and removed by means of line 213. The thus recovered solvent vapors are passed via lines 215 and 217 to compression means 442, wherein they are compressed and reliquefied. Upon removal of water and heavier contaminants, the compressed liquid propane is then passed back via line 221 into the propane supply system. Desolventized asphalt is then removed from the desolventizing zone 402 via line 211 to storage. The upper or propane-soluble portion of the feed, which is 60% of the total oil charge, is passed by means of line 223 to desolventizing zone 404 wherein the propane solvent is removed from the oil by flashing and passed to the aforementioned propane recovery system via lines 225, 215 and 217. The solvent-free deasphalted oil is removed from the bottom of desolventizing zone 404 and passed to extraction zone 406 for removal of the aromatics present in the deasphalted short residue oil. An aromatics-selective solvent is passed via lines 221 and 237 to extraction zone 406 and enters in such a manner as to pass countercurrently to the flow of charge oil. Phenol is a preferred solvent for removing aromatics from lubricating oil but others, such as furfural, nitrobenzene, sulfur dioxide, cresylic acids, sulfolane, and β,β′ dichloroethyl ether may also be used. About 2.25 volumes of phenol are employed per volume of deasphalted oil charge. The solvent-containing extract from zone 406 is then passed via line 229 to desolventizing zone 408 wherein the solvent is removed by one or more distillation steps, one of which may employ vacuum means. The desolventized aromatics are removed through line 231 to storage. The distilled solvent vapors are removed by line 235, condensed and cooled by means not shown and returned to the solvent supply system. The raffinate from extraction zone 406, which is considerably reduced in aromatics, contains a small amount of solvent and is passed through line 239 to desolventizing zone 410 wherein it is freed of solvent in a like manner to the extract. The solvent removed therefrom is then passed to the solvent recovery system via line 241.

The desolventized raffinate from zone 410 is then passed by means of line 243 to propane fractionation zone 412. Propane is passed from the propane supply system via line 244 to zone 412, wherein the raffinate is contacted with propane under the same conditions as outlined in the foregoing example and in the detailed description of FIG. I. The heavy propane-insoluble fraction passes to the bottom of zone 412 and is removed via line 246. The light propane soluble fraction is removed from the top of zone 412 by means of line 245.

In propane dewaxing of lubricating oils, normally 2 to 10 volumes of propane are employed per volume of waxy oil. Chilling of the waxy oil-propane mixture is accomplished by evaporation of the propane, and a constant ratio of propane-to-oil is usually required. Therefore, liquid makeup propane is furnished to the chilling zone for this purpose. In some instances, it may be desired to raise or lower the propane ratio or the rate of chilling, in which case the amount of makeup propane will be controlled accordingly by means well known to anyone skilled in the art of process control.

Since the propane-soluble fraction from zone 412 contains the bulk of the propane from the preceding fractionation step, the propane-soluble fraction will usually not require the addition of propane prior to dewaxing. Therefore, the propane-soluble fraction is generally passed directly to the dewaxing chilling zone 414, without the addition of propane, which may be added via lines 249 and 251 if the fractionation zone propane-soluble effluent contains insufficient propane. Normally, the propane-waxy oil mixture is cooled to about 65° F. (by indirect heat exchange means not shown). The mixture of propane and waxy oil is chilled to about −40° F. in chilling zone 414 to crystallize the wax. As propane evaporates from the chiller during the chilling process, makeup propane is added as necessary by means of line 249. Evaporated propane from the chiller is passed by means of line 253 to the propane recovery system via lines 215 and 217. The chilled slurry of wax, oil, and propane is then passed by means of line 255 to separation zone 416 wherein the wax is separated from the solution of oil and solvent by filtration or other suitable means, especially rotary drum filters. The oil-solvent solution filtrate from which the wax has been removed is removed from separation zone 416 by means of lines 257 and 259 to solvent removal zone 420, wherein the solvent is removed from dewaxed oil by distillation. The vaporized solvent is removed from zone 420 through line 261, cooled by means not shown, and returned to the solvent system. The desolventized dewaxed oil is passed to storage or further treatment by means of line 263.

The crude microcrystalline wax separated in zone 416, which normally contains a significant quantity of occluded and entrained oil, is passed through line 262 wherein it is mixed and repulped with chilled fresh propane furnished via lines 247 and 264. The repulped slurry of oil, wax, and propane is passed to filtration zone 418 wherein the wax is removed from the oil-solvent solution. The propane-oil filtrate from the repulping operation is passed via line 259 to desolventizing zone 420 in admixture with the filtrate from the preceding deoiling step. The deoiled wax contains less than 1% by volume oil after the deoiling step. The deoiled wax is passed to desolventizing zone 421 in which the residual propane is flashed overhead via line 269 to the propane recovery system.

The deoiled primary microcrystalline wax is passed through line 268 and mixed with wax-splitting solvent from lines 273 and 275, and heated to a temperature above the melting point of the HMP wax product. In the case of the instant East Texas material, it is heated to 195° F. The solvent-wax solution is cooled to a point about 65° F. below the melting point of the HMP wax, viz., here about 100–125° F., at which temperature the HMP wax is crystallized from solution. The slurry of crystallized HMP wax and wax-solvent solution is passed to filter 422 where the HMP wax is filtered out. The HMP wax is passed by means of line 277 to desolventizing zone 424 wherein the solvent contained in the wax is flashed off and removed via line 279. After condensation and cooling by means not shown, the solvent is returned via line 281 to the wax splitting solvent system. The desolventized HMP wax is removed via line 283 to further processing or storage. The filtrate solution of MX wax and solvent from zone 422 is passed via line 285 to distillation zone 426 in which the solvent is removed from the MX wax by vaporization and returned to the solvent system via line 281. The thus separated MX wax is removed from zone 426, solidified by cooling and passed to further processing via line 287.

The processing of the propane-insoluble fraction is essentially identical to that of the soluble portion, with the important exception that the dewaxing operation is slightly different. The propane-insoluble fraction from the bottom of fractionation zone 412 contains only a small amount of entrained or occluded propane. Therefore, as it is passed via line 246 to the dewaxing zone 414′, it is always necessary to add additional propane via lines 249′ and 251′ in order to increase the propane-feed ratio to a satisfactory value, i.e., at least 2 to 1. It is also preferred to use a higher propane-feed ratio on the heavier propane-insoluble fraction than for the lighter propane-insoluble fraction. (The terms "propane soluble" and "propane insoluble" are here used to identify the two fractions from the propane fractionation zone, and, of course, do not refer to their solubility in propane at conditions other than those under which they were fractionated.) The propane-insoluble fraction is dewaxed, deoiled, and the wax therefrom split in the same manner as the propane-soluble fraction. For this reason, a detailed description of subsequent processing of the propane-insoluble fraction is unnecessary though both are shown in FIG. II of the drawing.

The use of propane for both the dewaxing and deoiling steps of the process is advantageous in that it is the least difficult to remove from the oil and wax and heat requirements therefor are less. Moreover, though the total number of desolventizing steps is the same for the two modes of operation, if parallel operation is practiced, the overrall capital investment for the propane dewaxing and deoiling steps may be less since the necessary volumetric capacity of the deoiled wax desolventizing zones is smaller than that required for desolventizing the undewaxed propane fractions. Even further savings in fixed costs may be effected if propane is also used for the wax splitting operation, in which case the deoiled wax desolventizing zones may be eliminated.

However, the wax splitting operation is preferably conducted according to the method and manner described in Arabian, U.S. Patent 2,668,140 issued February 2, 1954. According to this method, any of the foregoing dewaxing solvents, except propane, as well as mixtures thereof with aromatic hydrocarbons such as benzene, toluene and the like may be used in the wax splitting operation. The wax splitting operation is carried out in a solvent-to-wax weight ratio of from about 2:1 to about 10:1, preferably from about 5:1 to about 9:1, at a temperature at least as high as about the normal melting point of the wax being treated, and generally about 150° F. to 170° F., and cooling the solvent-wax solution to a temperature from about 65° F. to about 80° F. below the desired melting point of the high melting, hard, paraffin wax which it is desired to precipitate from the solution and to recover as high melting wax. In order to recover hard wax with the highest melting point the difference between the melting point of said wax and the filtration temperature must be at a minimum, being of the order of about 65° F. or less. For each degree change in the melting point of the hard, high melting wax, the filtration temperature will be changed by about two degrees, on the same scale. In general, the filtration temperature should be about 100°

F. or higher, depending on the specific properties desired for the separated wax.

The characteristics of suitable stocks and the particular variations in the operations necessary to accommodate these and other variables have been described broadly and will therefore be well understood by those skilled in the art in view of the foregoing description of the invention. Various auxiliary equipment such as valves, pumping and heat exchange means have been excluded from the drawing for purposes of simplicity. Their appropriate inclusion in the practice of the invention will, however, be obvious to anyone skilled in the processing art from the detailed description of the drawing and of the process. It will be understood from the description of the invention that various modifications may be made within the scope and spirit of the invention such as the selection of particular solvents, particular crystallization and filtration temperatures, and the like.

I claim as my invention:

1. The method of producing hard, high melting, hydrocarbon wax products and plastic, high melting, paraffin wax products from a deasphaltized and selective solvent extracted paraffinic-naphthenic short residue which comprises contacting the short residue with liquid propane at a temperature within the range of from about 160° F. to about 220° F., separating therefrom a propane-soluble and a propane-insoluble short residue fraction, dewaxing separately both the propane-soluble and propane-insoluble fractions to separate respective crude waxes therefrom and deoiling the crude waxes and recovering primary microcrystalline wax from both the propane-soluble and propane-insoluble fractions, and separately splitting each of the primary microcrystalline waxes by dissolving each of the primary microcrystalline waxes in a dewaxing solvent at an elevated temperature, cooling the solution and separating the resulting solid wax from the remaining solution at a temperature of about 40° to 60° F., thereby recovering separately from both the propane-soluble and propane-insoluble fractions respective high melting, microcrystalline wax, separately dissolving each of the microcrystalline waxes in a dewaxing solvent at an elevated temperature, cooling the resulting solution and separating the resulting solid waxes from the remaining solution at a temperature at least as high as 100° F., thereby recovering separately from both the propane-soluble and propane-insoluble fraction a high melting, hard, hydrocarbon wax product, and recovering the remaining wax components from the solvent of the separated solutions as extensively branched plastic hydrocarbon waxes, the wax products from the propane-soluble fraction being of lower molecular weight, and the wax products from the propane-insoluble fraction being of higher molecular weight.

2. The method of claim 1 in which the short residue is treated with liquid propane at a temperature within the range of 160° F. to about the critical temperature of propane.

3. The method of claim 1 in which the short residue is the distillation residue of an East Texas crude oil stock.

4. The method of claim 1 in which the short residue is treated with liquid propane at a temperature within the range of 175 and 206° F.

5. The method of claim 1 in which the short residue is treated with from 5 to 30 volumes of propane per volume of short residue.

6. The method of claim 1 in which the short residue is treated with between 10 and 20 volumes of propane per volume of short residue charge.

7. The method of claim 1 in which the short residue is treated with about 11 volumes of propane at a temperature ranging from 185 to 206° F.

References Cited in the file of this patent

UNITED STATES PATENTS

| | | |
|---|---|---|
| 2,166,160 | King | July 18, 1939 |
| 2,248,373 | Merrill et al. | July 8, 1941 |
| 2,668,140 | Arabian | Feb. 2, 1954 |
| 2,682,523 | Talley et al. | June 29, 1954 |
| 2,730,452 | Johnston et al. | Jan. 10, 1956 |
| 2,939,838 | Murphey | June 7, 1960 |